(12) United States Patent
Toko

(10) Patent No.: US 10,859,227 B2
(45) Date of Patent: Dec. 8, 2020

(54) LIGHTING APPARATUS, OPTICAL PROJECTION SYSTEM

(71) Applicant: STANLEY ELECTRIC CO., LTD., Tokyo (JP)

(72) Inventor: Yasuo Toko, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 35 days.

(21) Appl. No.: 16/412,450

(22) Filed: May 15, 2019

(65) Prior Publication Data
US 2019/0360655 A1    Nov. 28, 2019

(30) Foreign Application Priority Data
May 24, 2018    (JP) .................................. 2018-099727

(51) Int. Cl.
*F21S 41/25* (2018.01)
*F21S 41/32* (2018.01)
*G02F 1/1335* (2006.01)

(52) U.S. Cl.
CPC .............. *F21S 41/25* (2018.01); *F21S 41/32* (2018.01); *G02F 1/133526* (2013.01)

(58) Field of Classification Search
CPC ...... F21S 41/25; F21S 41/32; G02F 1/133526
See application file for complete search history.

(56) References Cited

U.S. PATENT DOCUMENTS

2006/0209295 A1*    9/2006    Sugimoto ............ G09G 3/3629
356/130

FOREIGN PATENT DOCUMENTS

| DE | 10 2014 213 368 A1 | 1/2016 |
|---|---|---|
| DE | 10 2016 112 617 B3 | 10/2017 |
| EP | 2 642 187 A1 | 9/2013 |
| JP | 5238124 B2 | 7/2013 |
| JP | 2016-115412 A | 6/2016 |
| KR | 2018 0018938 A | 2/2018 |
| WO | 2017/214648 A1 | 12/2017 |

OTHER PUBLICATIONS

Extended European Search Report dated Jul. 16, 2019 in European Application No. 19175496.9.

\* cited by examiner

*Primary Examiner* — Anne M Hines
(74) *Attorney, Agent, or Firm* — Xsensus LLP

(57) ABSTRACT

To provide a lighting apparatus etc. that is capable of obtaining various light distribution patterns and is superior in light utilization efficiency. The lighting apparatus includes a light source, a light conversion part for converting the light emitted from the light source into nearly parallel beams, a light modulating part having a plurality of pixel regions arranged so that the nearly parallel beams can be incident and capable of switching between a light transmitting state and a light scattering state for each of the pixel regions, and a projection lens disposed on the light path of the nearly parallel beams and on the light emitting side of the light modulating part and where the projection lens projects an image formed by the light modulating part using the nearly parallel beams.

18 Claims, 12 Drawing Sheets

3

$n_1 < n_2$
$\theta 1 > \theta 2$

100b

100c 8a (8b)

8a, 8b

100d

100d

100e

100f

LIGHTING APPARATUS, OPTICAL PROJECTION SYSTEM

CROSS-REFERENCE TO RELATED APPLICATION

The present application claims priority to JP 2018-099727 filed May 24, 2018, the entire contents of which are incorporated herein by reference.

BACKGROUND OF THE INVENTION

Field of the Invention

The present invention relates to a lighting apparatus suitable as a vehicular lamp and an optical projection system using the lighting apparatus, for example.

Description of the Background Art

Japanese Patent No. 5238124 discloses a vehicular lamp in which the light distribution pattern is made variable by arranging a liquid crystal optical element having a grating part and a non-grating part adjacent to each other between the light source and the lens. When no voltage is applied, the liquid crystal optical element of this vehicular lamp shows a transparent state due to the uniformity of molecular arrangement and refractive index of the grating part and the non-grating part, and when voltage is applied, the light guided to the a liquid crystal layer is refracted in a predetermined direction to show a scattering state due to the difference in refractive index between the grating part and the non-grating part. Then, when no voltage is applied to the liquid crystal optical element, a basic light distribution pattern defined by the light source and the lens is obtained, and when voltage is applied to the liquid crystal optical element, a light distribution pattern spreading horizontally than the basic light distribution pattern is obtained.

Here, in the above-described conventional vehicular lamp, it is possible to variably set the horizontal width of the light distribution pattern by increasing or decreasing the voltage applied to the liquid crystal optical element. However, the conventional vehicular lamp has room for improvement in that it cannot obtain any other light distribution pattern. For example, when it is desired to obtain various light distribution patterns according to the conditions of other vehicles or pedestrians etc. present in front of the own vehicle, it is difficult to realize various light distribution patterns in the above-described vehicular lamp.

In this regard, for example, it is conceivable to use a liquid crystal element provided with a known polarizer in place of the liquid crystal optical element in the above-described conventional vehicular lamp. However, in this case, there is a drawback that light utilization efficiency is reduced. Here, such a disadvantage is not limited to vehicular lamp application, but may also occur in general lighting apparatus where it is desired to set various light distribution patterns.

In a specific aspect, it is an object of the present invention to provide a lighting apparatus etc. that is capable of obtaining various light distribution patterns and is superior in light utilization efficiency.

SUMMARY OF THE INVENTION

[1] WA lighting apparatus according to one aspect of the present invention includes (a) a light source, (b) a light conversion part for converting the light emitted from the light source into nearly parallel beams, (c) a light modulating part having a plurality of pixel regions arranged so that the nearly parallel beams can be incident and capable of switching between a light transmitting state and a light scattering state for each of the pixel regions, and (d) a projection lens disposed on the light path of the nearly parallel beams and on the light emitting side of the light modulating part and where the projection lens projects an image formed by the light modulating part using the nearly parallel beams.

[2] An optical projection system according to one aspect of the present invention includes the above-described lighting apparatus and a control device that controls the operation of each of the plurality of pixel regions in the light modulating part of the lighting apparatus.

According to the above-described configuration, it is possible to obtain a lighting apparatus etc. that is capable of obtaining various light distribution patterns and is superior in light utilization efficiency.

DESCRIPTION OF THE PREFERRED EMBODIMENTS

Embodiment 1

Figure 1:
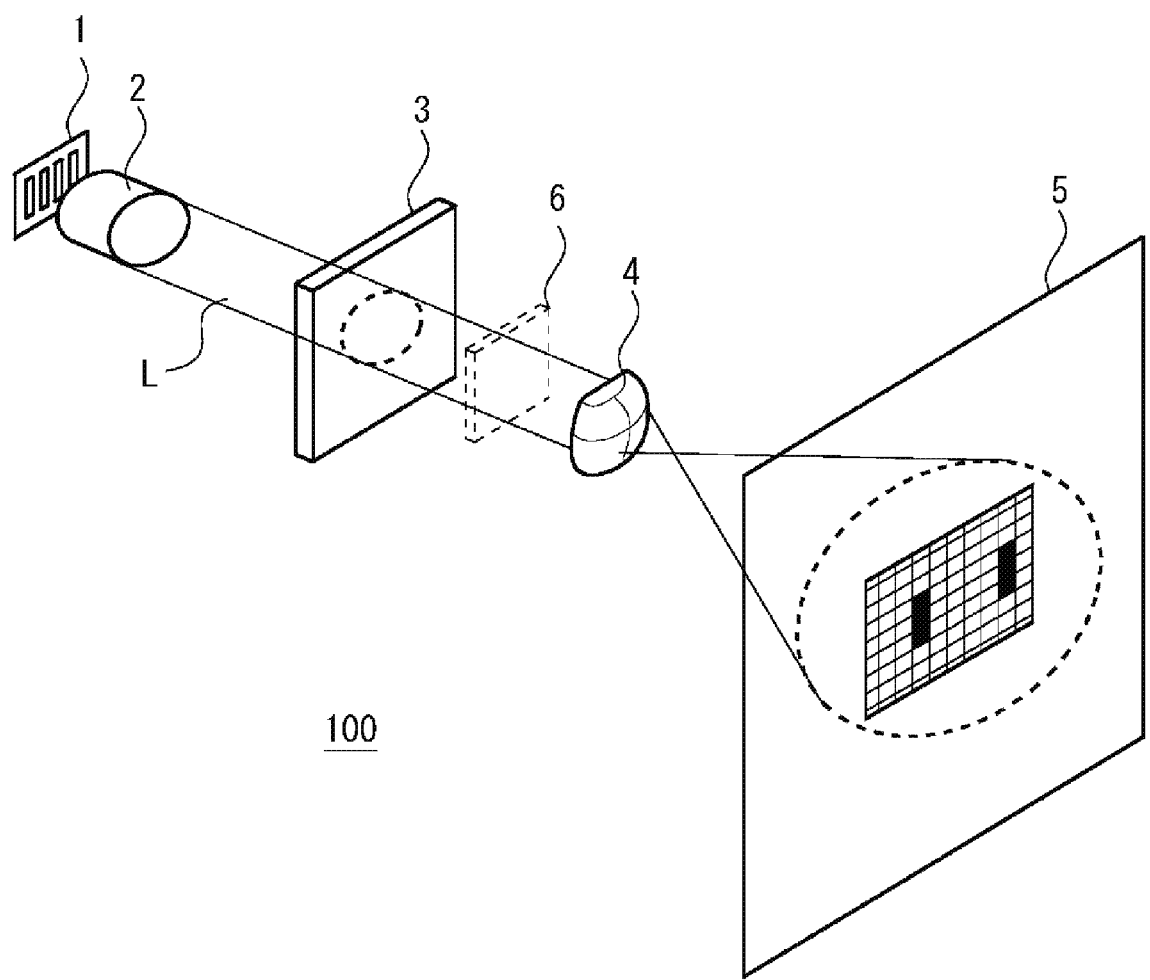
FIG. 1 is a schematic perspective view for explaining the light path of the nearly parallel beams of the optical projection system of embodiment 1.
Figure 2A:
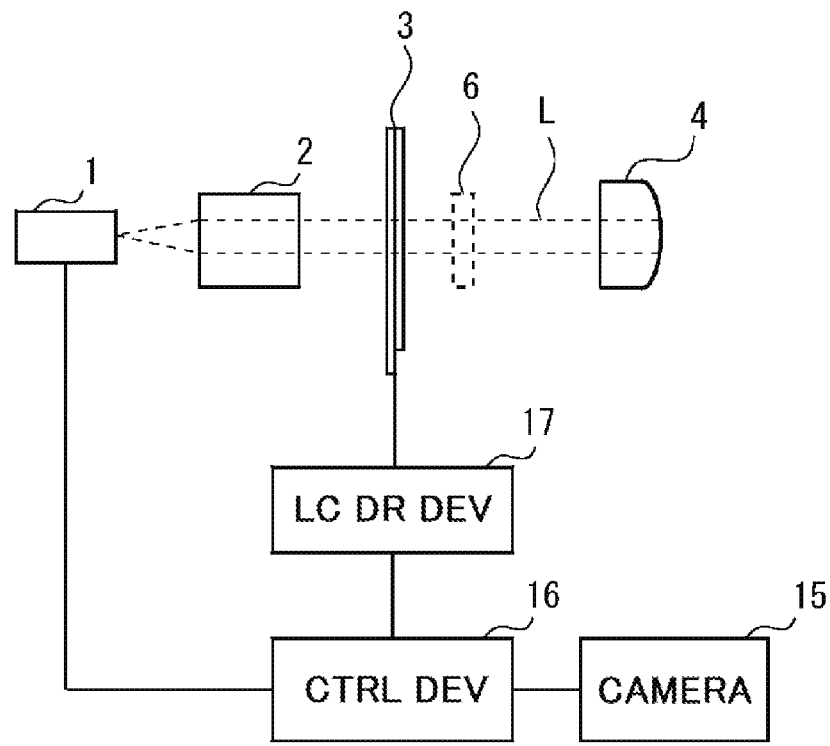
FIGS. 2A and 2B are diagrams for explaining the configuration of the optical projection system of embodiment 1.
Figure 2B:
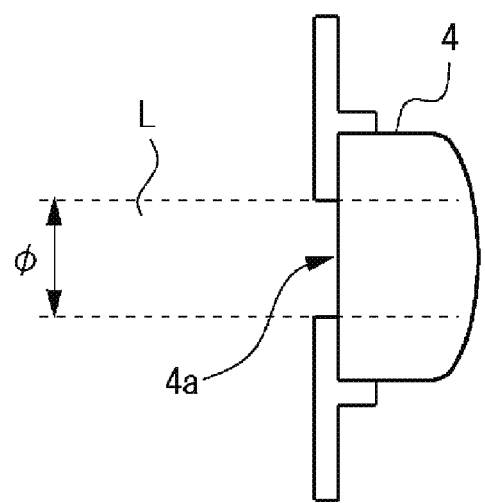

FIG. 1 is a schematic perspective view for explaining the light path of the nearly parallel beams of the optical projection system of embodiment 1. And FIGS. 2A and 2B are diagrams for explaining the configuration of the optical projection system of embodiment 1. The optical projection system 100 of the present embodiment shown in the figures is installed in a vehicle and is used as a vehicular lamp system for irradiating light forward of the vehicle. The optical projection system 100 according to the present embodiment performs selective light irradiation in the high beam irradiation range according to the condition of an object such as another vehicle or a pedestrian existing in front of the vehicle. For example, when irradiating a high beam (a traveling beam), the optical projection system 100 does not irradiate light to the region where another vehicle is present. The illustrated optical projection system 100 is configured to include a light source 1, a collimating optical system (a collimating part) 2, a diffusion type liquid crystal element 3, a projection lens 4, a camera 15, a control device 16 (abbreviated as CTRL DEV in FIG. 2A) and a liquid crystal driving device 17 (abbreviated as LC DR DEV in FIG. 2A).

The light source 1 is configured to include a semiconductor light emitting element such as a light emitting diode (LED) or a laser diode (LD) and its driving circuit, for example, and emits white light. The white light may be obtained by light conversion of light emitted from a laser diode by a fluorophor, for example. In addition, when the light source 1 is configured to include a laser diode that emits blue light, as indicated by a dotted line in the figure, a fluorophor 6 may be disposed on the light path and on the light emission side of liquid crystal element 3, thereby converting the blue light to white light by the fluorophor 6.

The collimating optical system (the light conversion part) 2 converts the light incident from the light source 1 into nearly parallel beams (spot light) L and emits the light.

The collimating optical system 2 of the present embodiment converts light emitted as it spreads from the light source 1 into nearly parallel beams that travel at a spread angle of about ±3 degrees or less, and allows the light to enter the liquid crystal element 3, for example. As such collimating optical system 2, an optical system combining various known lenses and reflectors can be used, for example. As the lens, a collimating lens, a aspherical lens, a cylindrical lens, a diffractive optical element (DOE), or the like may be used. In addition, a collimating lens disclosed in a publication such as Japanese Unexamined Patent Application Publication No. 2016-115412 may be used, for example.

The diffusion type liquid crystal element (light modulating part) 3 is disposed on the light path of the nearly parallel beams L emitted from the collimating optical system 2 and forms an image using the nearly parallel beams. The diffusion type liquid crystal element 3 according to the present embodiment has a plurality of pixel regions, and can individually control whether each pixel region is in a transparent state (a light transmission state) or in a state in which incident light is scattered (a scattering state). The nearly parallel beams pass through the diffusion type liquid crystal element 3 to form an image having a desired bright and dark pattern. In this embodiment, the diffusion type liquid crystal element 3 is preferably disposed in the vicinity of the focal point of the projection lens 4 on the light path.

The projection lens 4 projects an image (the image is reversed and projected) formed by the light passing through the diffusion type liquid crystal element 3. As a result, for example, a virtual screen 5 assumed at a position several tens of meters ahead of the vehicle can obtain a light distribution pattern having desired brightness and darkness. As shown in the enlarged view in FIG. 2B, the projection lens 4 has a light entrance port 4a where its diameter is comparable to or slightly smaller than the spot diameter φ of the nearly parallel beams L formed by the collimating optical system 2 and transmitting through the diffusion type liquid crystal element 3. In the illustrated example, the diameter of the light entrance port 4a is set by appropriately covering the outside of the flat surface of the projection lens 4 with a housing etc. However, the size of the projection lens 4 itself may be adjusted so that the diameter of its flat surface becomes the size suited for the light entrance port 4a. As a result, by controlling/switching the pixel region to be in light transmission state by the diffusion type liquid crystal element 3, the light travels straight through the pixel region and can be made incident to the projection lens 4. And, by controlling the pixel region to be in light scattering state by the diffusion type liquid crystal element 3, the light is scattered making it difficult to enter the projection lens 4. Thereby, the contrast of the light distribution pattern can be enhanced.

The camera 15 is disposed at a predetermined position of the vehicle (for example, the upper side of the windshield in the vehicle compartment), and performs predetermined image processing on an image/images obtained by photographing the space in front of the vehicle, thereby detecting objects such as other vehicles and pedestrians that exist in front of the vehicle. Here, if a camera is pre-installed in the vehicle for other purpose (for example, an automatic brake system etc.), then this camera may be shared for the above usage.

The control device 16 establishes a light distribution pattern such that the region where the other vehicles, etc. exist is set as the non-irradiation range and the region other than the aforementioned region is set as the light irradiation range, according to the detection result of the other vehicles, etc. by the camera 15, for example. Then, the control device 16 generates a control signal which enables the diffusion type liquid crystal element 3 to form the images corresponding to this light distribution pattern, and provides the control signal to the liquid crystal driving device 17. Further, the control device 16 generates a control signal for controlling the on/off operation of the light source 1 and provides this control signal to the light source 1. The control device 16 is realized by executing a predetermined operation program in a computer system including a CPU, a ROM, a RAM, and the like, for example.

The liquid crystal driving device 17 provides a drive signal (a drive voltage) to the diffusion type liquid crystal element 3 based on the control signal provided from the control device 16 in order to individually control the alignment state of the liquid crystal layer in each pixel region of the diffusion type liquid crystal element 3.

Figure 3:
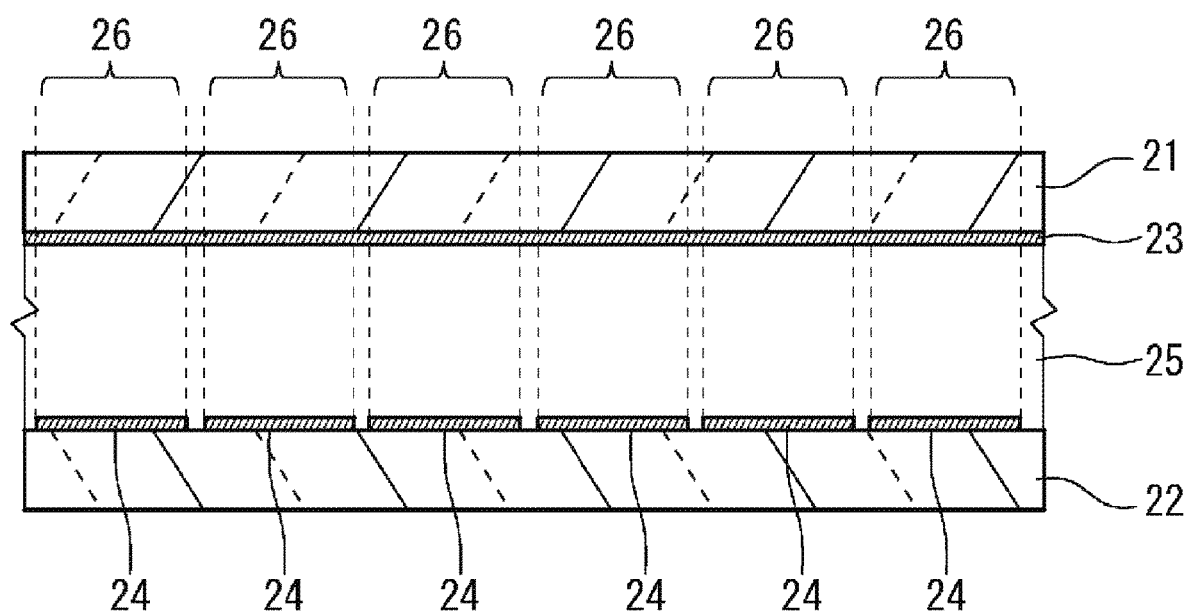
FIG. 3 is a schematic cross-sectional view showing the configuration of the diffusion type liquid crystal element.

FIG. 3 is a schematic cross-sectional view showing the configuration of the diffusion type liquid crystal element. The diffusion type liquid crystal element 3 is configured to include an upper substrate (first substrate) 21 and a lower substrate (second substrate) 22 disposed opposite to each other, a counter electrode (common electrode) 23 provided on the upper substrate 21, a plurality of pixel electrodes (individual electrodes) 24 provided on the lower substrate 22, and a liquid crystal layer 25 disposed between the upper substrate 21 and the lower substrate 22. Here, although illustration is omitted for convenience of explanation, the upper substrate 21 and the lower substrate 22 are properly provided with alignment films, respectively, for controlling the alignment state of the liquid crystal layer 25.

Each of the upper substrate 21 and the lower substrate 22 are rectangular shaped substrates in a plane view, and are disposed to face each other. As each substrate, for example, a transparent substrate such as a glass substrate or a plastic substrate may be used. A large number of spacers are uniformly distributed between the upper substrate 21 and the lower substrate 22, for example, and these spacers keep the substrate gap at a desired size (for example, about several µm). As spacers, plastic balls that can be dispersed by a dry type spacer spraying device may be used, or columnar bodies made of a resin material or the like provided in advance on a substrate may be used.

The counter electrode (common electrode) 23 is provided on one side of the upper substrate 21. The counter electrode 23 is integrally provided so as to face each pixel electrode 24 of the lower substrate 22. The counter electrode 23 is configured by appropriately patterning a transparent conductive film such as indium-tin oxide (ITO), for example.

The plurality of pixel electrodes (individual electrodes) 24 is provided on one side of the lower substrate 22. These pixel electrodes 24 are configured by appropriately patterning a transparent conductive film such as indium-tin oxide (ITO), for example. Each pixel electrode 24 has a rectangular outer edge shape in a plane view, for example, and is arranged in a matrix along the x direction and the y direction. A gap is provided between each pixel electrode 24. Each of the overlapping regions of the counter electrode 23 and the pixel electrodes 24 constitutes the pixel region (light control region) 26 described above.

The liquid crystal layer 25 is provided between the upper substrate 21 and the lower substrate 22. In the present embodiment, the liquid crystal layer 25 is configured to freely switch each pixel region 26 to either transmit or scatter the incident light. The specific configuration of the liquid crystal layer 25 will be described later.

The diffusion type liquid crystal element 3 of the present embodiment has several tens to several hundreds of pixel regions 26 in which each region is defined as the region where the counter electrode 23 and each pixel electrode 24 overlap in a plane view, and these pixel regions 26 are arranged in a matrix in a plane view. In the present embodiment, the shape of each pixel region 26 is a square, for example, but the shape of each pixel region 26 can be set arbitrarily, such as a mixture of rectangular and square shapes. Further, although the pixel regions 26 are arranged in a matrix, it is not mandatory to arrange them in a matrix. The counter electrode 23 and each pixel electrode 24 are connected to a liquid crystal driving device 17 via wiring members (not shown), and are statically driven, for example. The applied voltage at that time is a square wave voltage of about 100 Hz to 1 kHz, and the voltage range is about 0 to 250 V, for example.

Figure 4A:
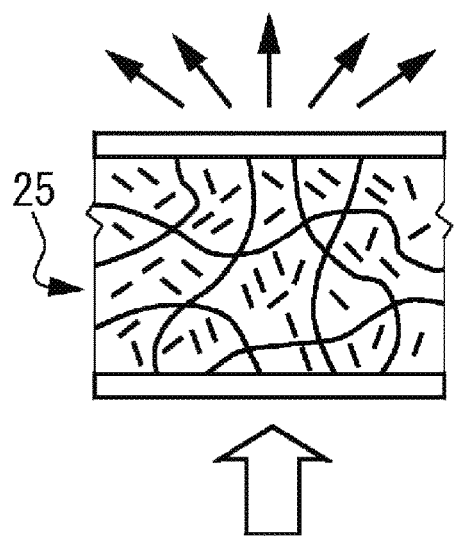
FIGS. 4A to 4D are diagrams for explaining configuration examples of liquid crystal layers in the diffusion type liquid crystal elements.
Figure 4B:
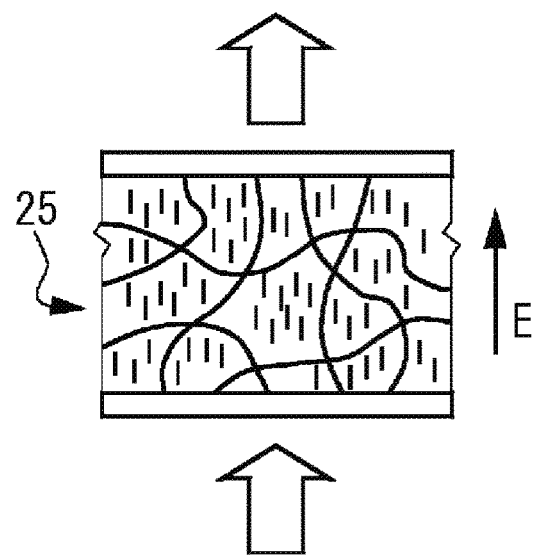

FIGS. 4A to 4D are diagrams for explaining configuration examples of liquid crystal layers in the diffusion type liquid crystal elements. The liquid crystal layer 25 shown in each of FIGS. 4A and 4B is a liquid crystal layer of a so-called normal mode polymer network type liquid crystal element, and this liquid crystal layer 25 includes a liquid crystal material and a polymer network. In the figures, liquid crystal molecules of the liquid crystal material are represented in a bar shape, and the polymer network is represented in a curved shape (the same applies hereinafter). As the polymer network, a material having a similar ordinary ray refractive index no to that of the liquid crystal material of the liquid crystal layer 25 is used, and is formed in a mesh shape as illustrated in the figures, for example. In addition, the liquid crystal material is formed using a material having a positive dielectric anisotropy $\Delta\varepsilon$. As referred to in the above description that the substrates are provided with alignment films, in this case, the liquid crystal layer 25 is provided with horizontal alignment films. Although the initial alignment state of the liquid crystal layer 25 is defined by the horizontal alignment films, the liquid crystal molecules are not completely horizontally aligned, and the alignment direction differs depending on the location thereof.

In the case of the diffusion type liquid crystal element 3 having such liquid crystal layer 25, when a voltage is not applied to the liquid crystal layer 25, since difference occurs in refractive index at the interface between the liquid crystal molecules and the polymer network, the incident light is scattered (refer to FIG. 4A). Thus, very little light is transmitted in the front direction, and it is visually recognized as a dark state. Further, when a voltage is applied to the liquid crystal layer 25, since the alignment direction of the liquid crystal molecules is rearranged in the direction of the electric field E, a state where no substantial difference (or very little difference) in refractive index occurs at the interface between the polymer network and the liquid crystal material, and the incident light is transmitted as it is (refer to FIG. 4B). Thus, the light transmitted in the front direction increases, and is visually recognized as a bright state. Such switching between the bright state and the dark state can be performed for each pixel region 26.

Figure 4C:
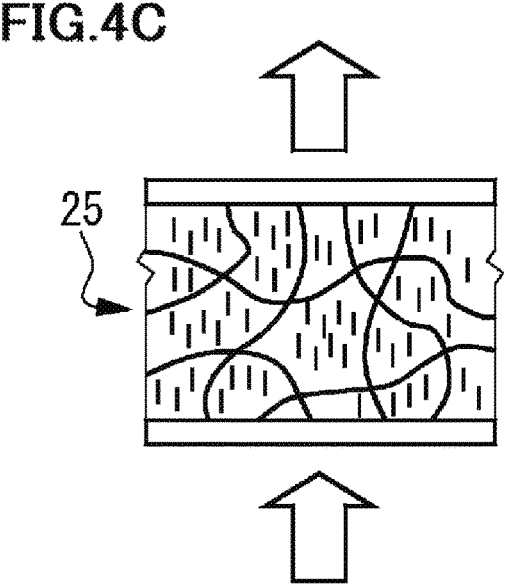
Figure 4D:
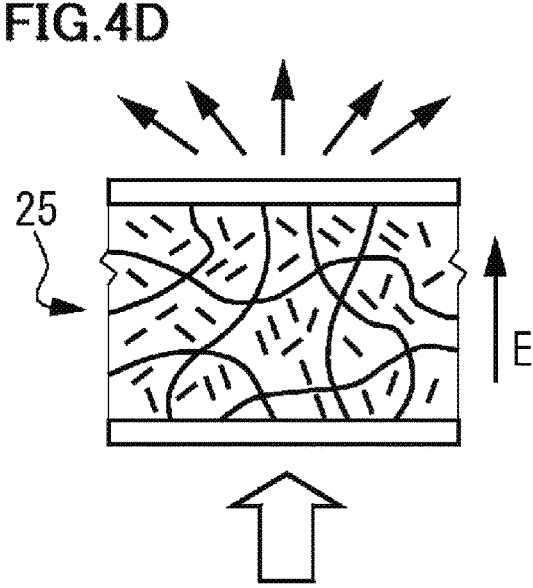

The liquid crystal layer 25 shown in FIGS. 4C and 4D is a liquid crystal layer of a so-called reverse mode polymer network type liquid crystal element, and this liquid crystal layer 25 includes a liquid crystal material and a polymer network. As the polymer network, a material having a similar ordinary ray refractive index no to that of the liquid crystal material of the liquid crystal layer 25 is used, and it is formed in a mesh shape as illustrated in the figures, for example. In addition, the liquid crystal material is formed using a material having a negative dielectric anisotropy $\Delta\varepsilon$. As referred to in the above description that the substrates are provided with alignment films, in this case, the liquid crystal layer 25 is provided with vertical alignment films. And the liquid crystal molecules are aligned approximately in the direction perpendicular to the substrate surface.

In the diffusion type liquid crystal element 3 having such liquid crystal layer 25, an operation opposite to that of the above-described normal mode is realized. That is, when a voltage is not applied to the liquid crystal layer 25, a state where there is no substantial difference (or very little difference) in refractive index occurs at the interface between the polymer network and the liquid crystal material, and the incident light is transmitted as it is (refer to FIG. 4C). Thus, the light transmitted in the front direction increases, and it is visually recognized as a bright state. Further, when a voltage is applied to the liquid crystal layer 25, since the alignment direction of the liquid crystal molecules is rearranged in the direction perpendicular to the electric field E, difference occurs in refractive index at the interface between the liquid crystal molecules and the polymer network, and the incident light is scattered (refer to FIG. 4D). Thus, very little light is transmitted in the front direction, and it is visually recognized as a dark state. Such switching between the bright state and the dark state can be performed for each pixel region 26.

Figure 5A:
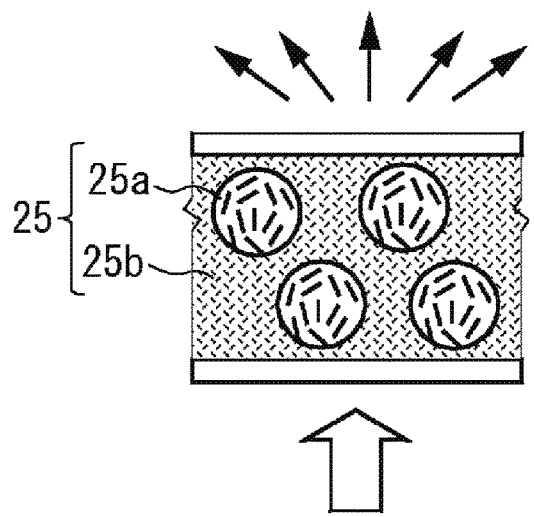
FIGS. 5A to 5D are diagrams for explaining configuration examples of the liquid crystal layer in the diffusion type liquid crystal element.
Figure 5B:
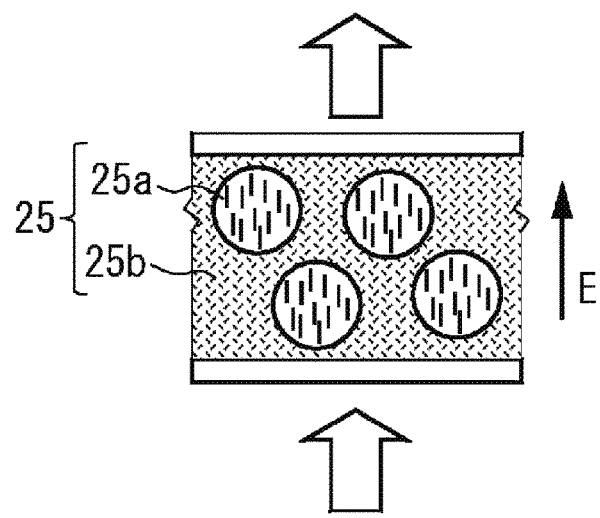

FIGS. 5A to 5D are diagrams for explaining configuration examples of the liquid crystal layer in the diffusion type liquid crystal element. The liquid crystal layer 25 shown in FIGS. 5A and 5B is a liquid crystal layer in a polymer dispersed liquid crystal element. This liquid crystal layer 25 includes a plurality of liquid droplets 25a containing liquid crystal material and a polymer portion 25b. As the polymer portion 25b, a material having a similar ordinary ray refractive index no to that of the liquid crystal material of the liquid crystal layer 25 is used. Although the liquid crystal material is formed using a material having a positive dielectric anisotropy 4E, a material having a negative dielectric anisotropy $\Delta\varepsilon$ may also be used.

In the case of the diffusion type liquid crystal element 3 having such a liquid crystal layer 25, when a voltage is not applied to the liquid crystal layer 25, since the liquid crystal molecules in the droplet 25a are randomly aligned, difference occurs in refractive index at the interface between the plurality of liquid droplets 25a and the polymer portion 25b, thereby the incident light is scattered. Thus, very little light is transmitted in the front direction, and it is visually recognized as a dark state. Further, when a voltage is applied to the liquid crystal layer 25, since the alignment direction of the liquid crystal molecules is rearranged in the direction of the electric field E, a state where there is no substantial difference (or very little difference) in refractive index occurs at the interface between the polymer network and the liquid crystal material, and the incident light is transmitted as it is (refer to FIG. 5B). Thus, the light transmitted in the front direction increases, and it is visually recognized as a bright state. Such switching between the bright state and the dark state can be performed for each pixel region 26.

Figure 5C:
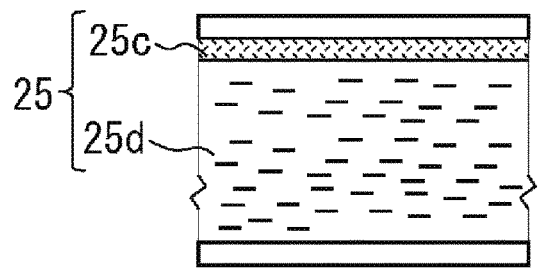

The liquid crystal layer 25 shown in FIG. 5C is a liquid crystal layer in the liquid crystal element of a liquid crystal/polymer phase-separated structure which includes a polymer network layer 25c and a liquid crystal material portion 25d. The polymer network layer 25c is a layer comprised of a polymer network formed in the vicinity of the interface between one substrate (for example, the first substrate 21) and the liquid crystal layer 25. For example, it is known that the polymer is preferentially polymerized in the vicinity of the interface by mixing and polymerizing the liquid crystal material at a monomer concentration of 5% by weight or less, and thus the polymer network layer 25c can be formed in the vicinity of the interface. As the polymer network layer 25c, a material having a similar ordinary ray refractive index no to that of the liquid crystal material of the liquid crystal layer 25 is used.

In the case of a diffusion type liquid crystal element 3 having such a liquid crystal layer 25, a fine uneven region (a fine recession and projection) is generated on the surface of the polymer network layer 25c. Thus, in case where the initial alignment of the liquid crystal material portion 25d is set to a random horizontal alignment, when a voltage is not applied, due to the difference between the extraordinary refractive index ne of the liquid crystal material and the refractive index of the polymer network layer 25c, light passing through the fine uneven region is scattered. Thus, very little light is transmitted in the front direction, and it is visually recognized as a dark state. On the other hand, when a voltage is applied, the liquid crystal molecules of the liquid crystal material portion 25d are aligned in the direction of the electric field, and since there is no difference between the refractive index no of the liquid crystal material and the refractive index of the polymer network layer 25c, light is transmitted without being scattered. Thus, the light transmitted in the front direction increases, and it is visually recognized as a bright state. Such switching between the bright state and the dark state can be performed for each pixel region 26.

Figure 5D:
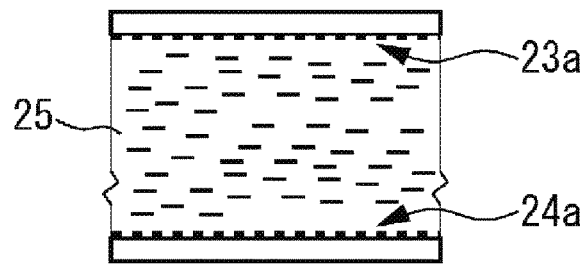

The liquid crystal layer 25 shown in FIG. 5D is a liquid crystal layer of a liquid crystal element in which fine uneven regions (fine recessions and projections) are provided on the substrate surfaces. This liquid crystal layer 25 is disposed in contact with the fine uneven regions 23a and 24a provided at the upper and lower interfaces in contact with the liquid crystal layer 25. In the present embodiment, the uneven region 23a is provided on the surface of the counter electrode 23, and the uneven region 24a is provided on the surface of each pixel electrode 24. Such uneven regions 23a and 24a are obtained by performing a process such as sand blasting on the surface of each electrode, for example.

In the case of a diffusion type liquid crystal element 3 having such a liquid crystal layer 25, a fine uneven region is generated at each interface in contact with the liquid crystal layer 25. Thus, in case where the initial alignment of the liquid crystal material portion 25d is set to a random horizontal alignment, when a voltage is not applied, due to the difference between the extraordinary refractive index ne of the liquid crystal material and the refractive index of the uneven regions 23a and 24a, light passing through the fine uneven region is scattered. Thus, very little light is transmitted in the front direction, and it is visually recognized as a dark state. On the other hand, when a voltage is applied, the liquid crystal molecules of the liquid crystal layer 25 are aligned in the direction of the electric field, and since there is no difference between the refractive index no of the liquid crystal material and the refractive index of the uneven regions 23a and 24a, light is transmitted without being scattered. Thus, the light transmitted in the front direction increases, and it is visually recognized as a bright state. Such switching between the bright state and the dark state can be performed for each pixel region 26.

Figure 6A:
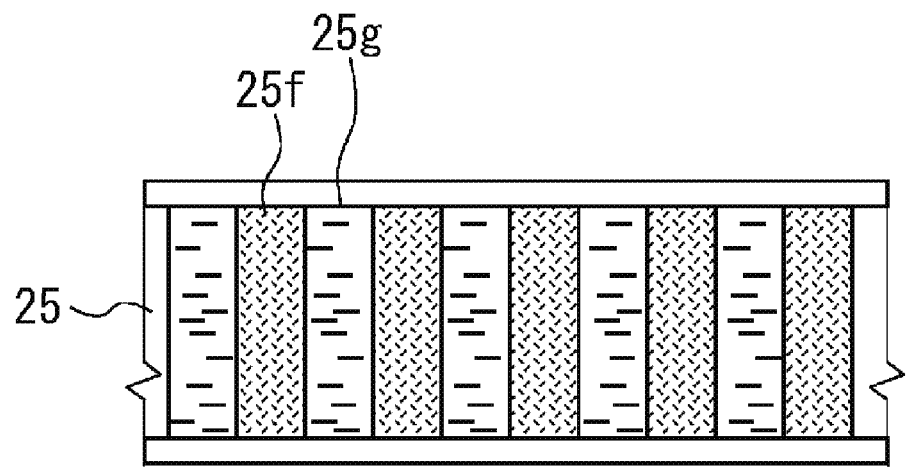
FIGS. 6A and 6B are diagrams for explaining the configuration example of the liquid crystal layer in the diffusion type liquid crystal element.

The liquid crystal layer 25 shown in FIG. 6A has a plurality of a grating parts 25f and non-grating parts 25g alternately arranged one by one in one direction (horizontal direction in the figure) parallel to the substrate surface. The grating part 25f is formed in a stripe extending in a direction perpendicular to the paper surface of the figure, for example, and each line width (width in the horizontal direction in the figure) is about 10 to 100 μm. The same applies to the non-growing part 25g which is formed in a stripe and has a width of about 10 to 100 μm. Each of the grating parts 25f is formed by containing a liquid crystal monomer to the liquid crystal material and polymerizing it. Here, a liquid crystal element having such a liquid crystal layer 25 is disclosed in detail in Japanese Patent No. 5238124, for example.

Figure 6B:
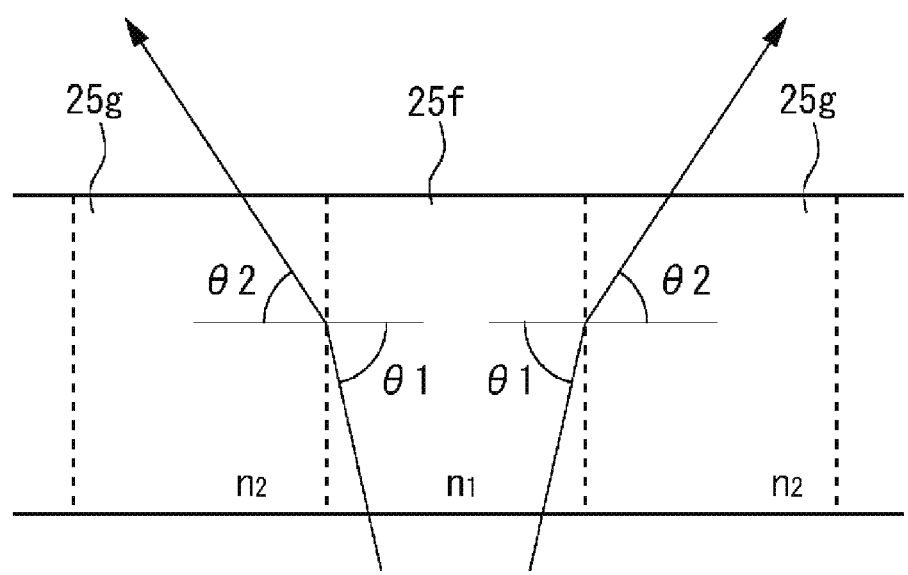

FIG. 6B is a diagram for describing an operation principle of the diffusion type liquid crystal element having the liquid crystal layer shown in FIG. 6A. First, when a voltage is not applied to the liquid crystal layer 25, there is no interface having a very different refractive index between the grating part 25f and the non-grating part 25g. This is because the polymerized grating part 25f has a structure in which the initial alignment of the liquid crystal is fixed, and the refractive index distribution of the liquid crystal monomer before polymerization and the liquid crystal substantially match with each other, and further, this refractive index distribution is maintained even after polymerization. Thus, since light is transmitted without being scattered, the light transmitted in the front direction increases, and it is visually recognized as a bright state.

On the other hand, when a voltage is applied to the liquid crystal layer 25 in the layer thickness direction, there is no change in the grating part 25f because the structure is fixed. However, in the non-grating part 25g, the alignment direction of the liquid crystal molecules changes according to the applied voltage. Therefore, an interface of different refractive index is generated between the non-growing part 25g and the grating part 25f. The light traveling to the interface between the grating part 25f and the non-grating part 25g is refracted in the direction according to the difference in refractive index. Here, the value of the refractive index difference at the interface differs depending on the light entry angle. In addition, since a fine uneven region is present on the surface of the a grating part 25f polymerized by ultraviolet irradiation, the light incident on the interface has a variation in the outgoing direction. Thus, since light passing through the liquid crystal layer 25 is scattered, very little light is transmitted in the front direction, and it is visually recognized as a dark state. Such switching between the bright state and the dark state can be performed for each pixel region 26.

FIGS. 7A to 7D are diagrams schematically showing the configuration of modified examples of the diffusion type liquid crystal element. Here, in order to explain in detail the difference of the electrode structure, a schematic view is shown in which elements other than the electrode structure are omitted. In the diffusion type liquid crystal element 3 shown in FIG. 7A, a pair of electrodes 34a and 34b is provided on one surface side of the second substrate 22 for each pixel region 26. Here, each electrode may be provided on the first substrate 21 side. Although not shown in the figure, a liquid crystal layer is provided between the first substrate 21 and the second substrate 22. The width of each of the electrodes 34a and 34b is preferably set relatively narrow to about 2 μm, for example. Further, it is preferable to set the distance between the electrode 34a and the electrode 34b to about 2 μm. Moreover, the layer thickness of the liquid crystal layer is preferably set to about 20 μm, for example.

Figure 7A:
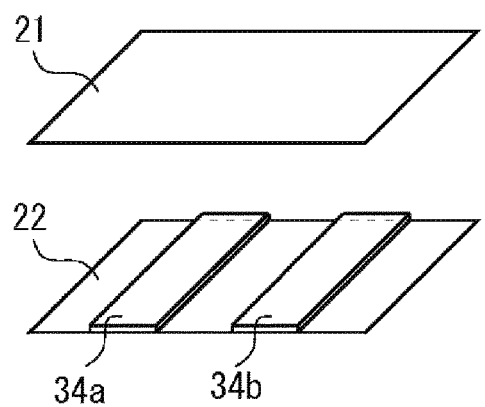
FIGS. 7A to 7D are diagrams schematically showing the configuration of modified examples of the diffusion type liquid crystal element.
Figure 7B:
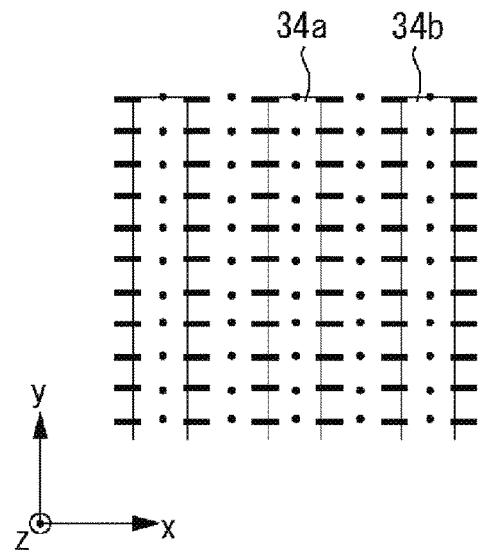

FIG. 7B is a schematic view for explaining the operation of the diffusion type liquid crystal element 3 shown in FIG. 7A. Here, the alignment state of the liquid crystal molecules is shown when the liquid crystal layer is viewed in a plane view. Each of the x and y directions in the figure is a direction parallel to the substrate surface of the first substrate 21 or the second substrate 22, and the z direction is the layer thickness direction of the liquid crystal layer. When a voltage is applied between the electrodes 34a and 34b, liquid crystal molecules are aligned in the x direction along the direction of the electric field generated between the electrodes, as shown in the figure. At immediately above the electrodes 34a and 34b, the alignment of the liquid crystal molecules does not change. Thus, when a voltage is applied, light passing through the liquid crystal layer is scattered and very little light is transmitted in the front direction, thereby it is visually recognized as a dark state. On the other hand, when no voltage is applied, since the alignment of the liquid crystal molecules is uniform, the light passing through the liquid crystal layer is not scattered. Thereby, the light transmitted in the front direction is increased, and it is recognized as a bright state. Such switching between the bright state and the dark state can be performed for each pixel region 26.

Figure 7C:
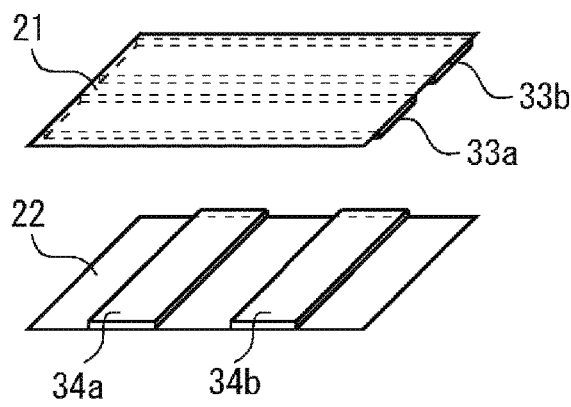

In the diffusion type liquid crystal element 3 shown in FIG. 7C, a pair of electrodes 34a and 34b is provided on one surface side of the second substrate 22 for each pixel region 26, and a pair of electrodes 33a and 33b is provided on one surface side of the first substrate 21. The extending direction of each electrode 33a, 33b and the extending direction of each electrode 34a, 34b cross each other (for example, orthogonally). Although not shown in the figure, a liquid crystal layer is provided between the first substrate 21 and the second substrate 22. The preferred values of the widths of each of the electrodes 33a, 33b, 34a, 34b and the mutual distance are the same as the values described above. Further, the layer thickness of the liquid crystal layer is preferably set to about 20 μm, for example.

Figure 7D:
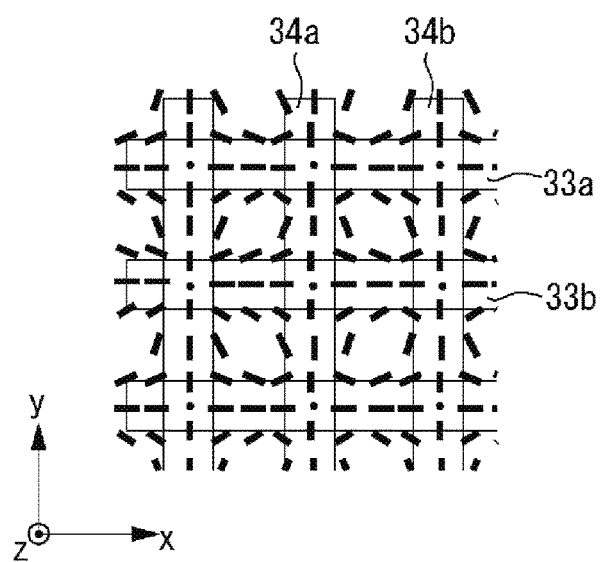

FIG. 7D is a schematic view for explaining the operation of the diffusion type liquid crystal element 3 shown in FIG. 7C. Here, the alignment state of the liquid crystal molecules is shown when the liquid crystal layer is viewed in a plane view. Each of the x and y directions in the figure is a direction parallel to the substrate surface of the first substrate 21 or the second substrate 22, and the z direction is the layer thickness direction of the liquid crystal layer. When a voltage is applied between the electrodes 33a, 33b, 34a and 34b, liquid crystal molecules are aligned in the x direction, y direction and oblique direction depending on the location, along the direction of the electric field generated between the electrodes, as shown in the figure. Further, at immediately above the electrodes 33a, 33b, 34a and 34b, the alignment of the liquid crystal molecules also changes. Thus, when a voltage is applied, light passing through the liquid crystal layer is scattered and very little light is transmitted in the front direction, thereby it is visually recognized as a dark state. Stronger scattering is obtained as compared to the diffusion type liquid crystal element 3 shown in FIG. 7A. Further, when no voltage is applied, since the alignment of the liquid crystal molecules is uniform, the light passing through the liquid crystal layer is not scattered. Thereby, the light transmitted in the front direction is increased, and it is recognized as a bright state. Such switching between the bright state and the dark state can be performed for each pixel region 26.

According to the above-described embodiment 1, it is possible to obtain various light distribution patterns and to obtain vehicular lamps (lighting apparatus) and vehicular lamp systems (optical projection system) that are superior in light utilization efficiency. Specifically, by controlling the light transmission state and the light scattering state in each pixel region, an image having a bright state or a dark state corresponding to each pixel electrode is formed, and various light distribution patterns are obtained by projecting the image. In addition, by using a diffusion type liquid crystal element which does not require use of polarizers, since the transmittance can be increased, the light utilization efficiency can be improved. Furthermore, since the number of components is smaller, the optical system is simplified and optical design is facilitated, and further, due to the reduction in the number of the components, cost reduction can be realized.

Embodiment 2

Figure 8:
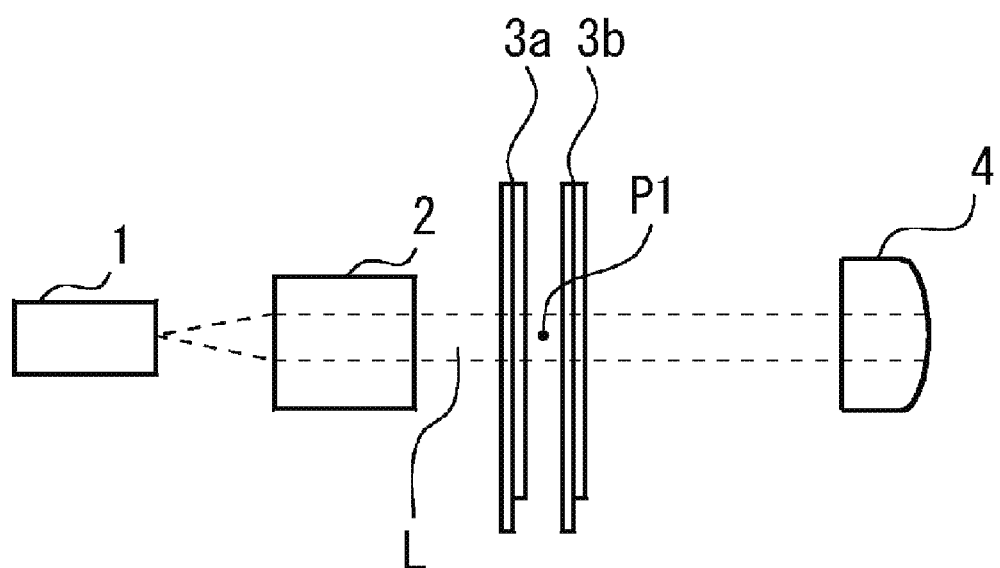
FIG. 8 is a diagram for explaining the configuration of the optical projection system of embodiment 2.

FIG. 8 is a diagram for explaining the configuration of the optical projection system of embodiment 2. Here, in embodiment 2, the optical system configuration of the optical projection system 100a is the same as that of the optical projection system 100 of embodiment 1 (refer to FIG. 1), and the electrical configuration of the optical projection system 100a is also the same as that of the optical projection system 100 of embodiment 1 (refer to FIGS. 2A-2B). The only difference between the optical projection system 100a and the optical projection system 100 is that two diffusion type liquid crystal elements are provided in the optical projection system 100a. Therefore, the description of the configurations and their achieved results (effects) common to the two embodiments will be omitted, and the configurations and their results different from each other are described below.

Diffusion type liquid crystal elements 3a and 3b are disposed on the light path of the nearly parallel beams L emitted from the collimating optical system 2, and an image is formed using the nearly parallel beams L. The diffusion type liquid crystal element 3a is disposed on the side close to the collimating optical system 2, and the diffusion type liquid crystal element 3b is disposed on the side close to the projection lens 4. As in the case of embodiment 1, the diffusion type liquid crystal elements 3a and 3b each has a plurality of pixel regions, and can individually control whether each pixel region is in a transparent state (a light transmission state) or in a state in which incident light is scattered (a scattering state). As the nearly parallel beams L pass through the diffusion type liquid crystal elements 3a and 3b, an image having a desired bright and dark pattern is formed. By using two diffusion type liquid crystal elements 3a and 3b, the contrast of the projected image can be further enhanced. Here, it is preferable to arrange the focal point of the projection lens 4 at either between the diffusion type liquid crystal elements 3a and 3b or in the vicinity of position P1 of the diffusion type liquid crystal element 3b on the light emitting side.

Embodiment 3

Figure 9A:
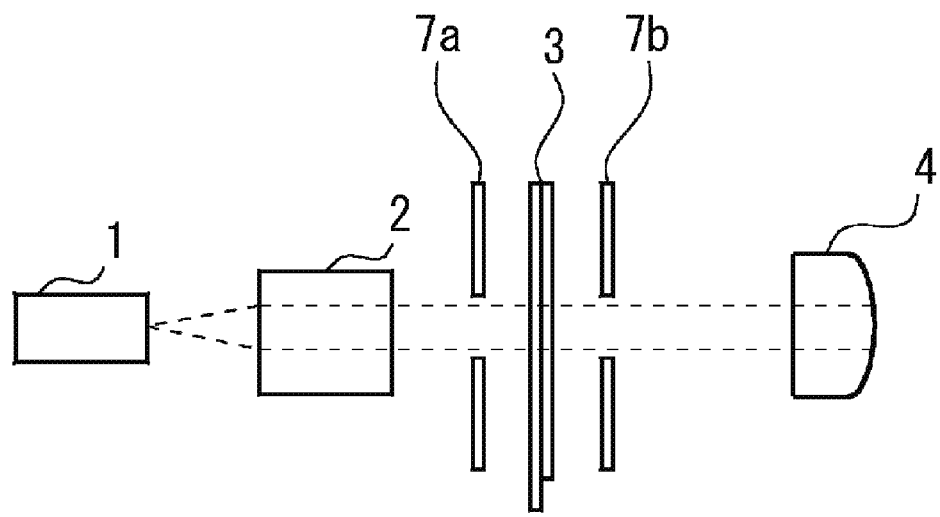
FIGS. 9A and 9B are diagrams for explaining the configuration of the optical projection system of embodiment 3.

FIG. 9A is a diagram for explaining the configuration of the optical projection system of embodiment 3. Here, in embodiment 3, the optical system configuration of the optical projection system 100b is the same as that of the optical projection system 100 of embodiment 1 (refer to FIG. 1), and the electrical configuration of the optical projection system 100b is also the same as that of the optical projection system 100 of embodiment 1 (refer to FIGS. 2A-2B). The only difference between the optical projection system 100b and the optical projection system 100 is that two optical diaphragm members 7a and 7b are provided to the front and back of the diffusion type liquid crystal element 3 in the optical projection system 100b. Therefore, the description of the configurations and their achieved results common to the two embodiments will be omitted, and the configurations and their results different from each other are described below.

Figure 9B:
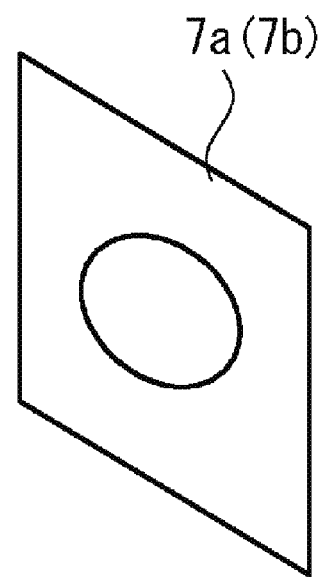

The optical diaphragm members 7a and 7b are flat members respectively, and have a through hole at the center as shown in FIG. 9B. These optical diaphragm members 7a and 7b are provided such that the respective through holes are positioned on the light path of the nearly parallel beams L formed by the collimating optical system 2. In the present embodiment, the optical diaphragm members 7a and 7b are disposed such that the light incident surface and the light emission surface are substantially orthogonal to the traveling direction of the nearly parallel beams.

By providing the optical diaphragm member 7b between the diffusion type liquid crystal element 3 and the projection lens 4, the contrast of the projection image by the projection lens 4 can be enhanced. Therefore, only the optical diaphragm member 7b may be provided. Further, by providing the optical diaphragm member 7a between the collimating optical system 2 and the diffusion type liquid crystal element 3, the contrast of the projected image can be further enhanced. Although this embodiment 3 can be configured not to use the collimating optical system 2, it is more preferable to form the nearly parallel beams by the collimating optical system 2 from the viewpoint of light utilization efficiency.

Embodiment 4

Figure 10A:
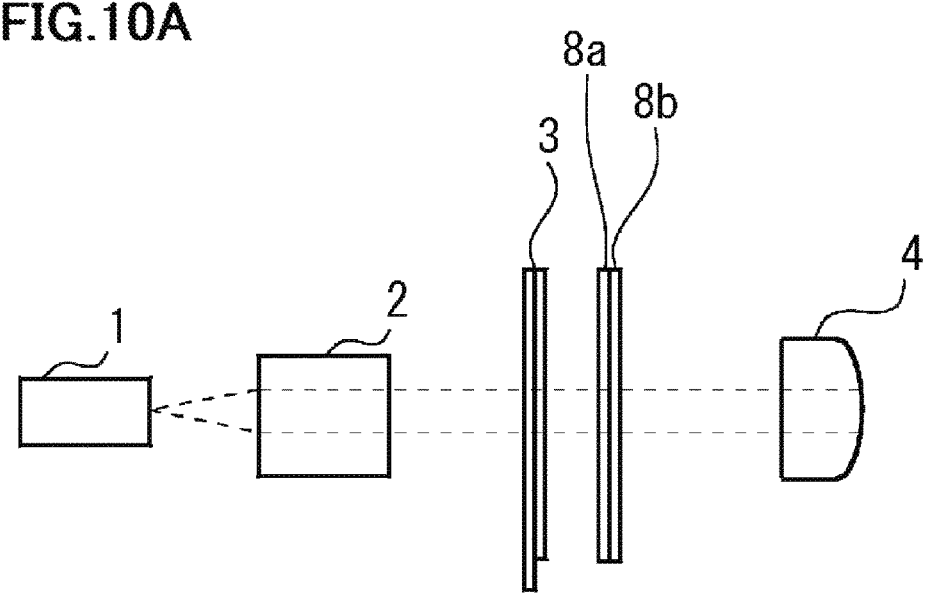
FIGS. 10A to 10C are diagrams for explaining the configuration of the optical projection system of embodiment 4.

FIG. 10A is a diagram for explaining the configuration of the optical projection system of embodiment 4. Here, in embodiment 4, the optical system configuration of the optical projection system 100c is the same as that of the optical projection system 100 of embodiment 1 (refer to FIG. 1) and the electrical configuration of the optical projection system 100c is also the same as that of the optical projection system 100 of embodiment 1 (refer to FIGS. 2A-2B). The only difference between the optical projection system 100c and the optical projection system 100 is that louvers 8a and 8b are provided on the light path between the diffusion type liquid crystal element 3 and the projection lens 4. Therefore, the description of the configurations and their achieved results common to the two embodiments will be omitted, and the configurations and their results different from each other are described below.

Figure 10B:
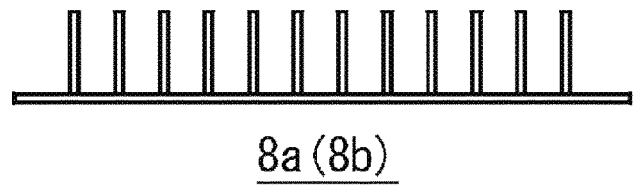
Figure 10C:
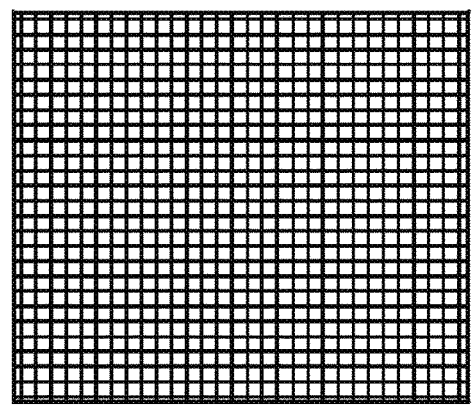

As shown in FIG. 10B, each of the louvers 8a and 8b has a plurality of light shielding walls projecting in the direction orthogonal to the one surface side of the flat plate-shaped member. These light shielding walls extend in the direction orthogonal to the paper surface. Further, as shown schematically in FIG. 10C, the louvers 8a and 8b are arranged in an overlapping manner such that the extending direction of each light shielding wall of the louver 8a and the extending direction of each light shielding wall of the louver 8b cross orthogonally.

By arranging the louvers 8a and 8b overlapped in this manner on the light emitting surface side of the diffusion type liquid crystal element 3, it is possible to block the light spreading in two directions. That is, the light passing through the transparent state pixel regions 26 of the diffusion type liquid crystal element 3 passes through each louver 8a and 8b, while the light passing through the scattering state pixel regions 26 are absorbed by the light shielding wall of louvers 8a and 8b. Therefore, the contrast of the projected image can be improved. Here, it is also preferable to further arrange similar louvers between the collimating optical system 2 and the diffusion type liquid crystal element 3.

Embodiment 5

Figure 11A:
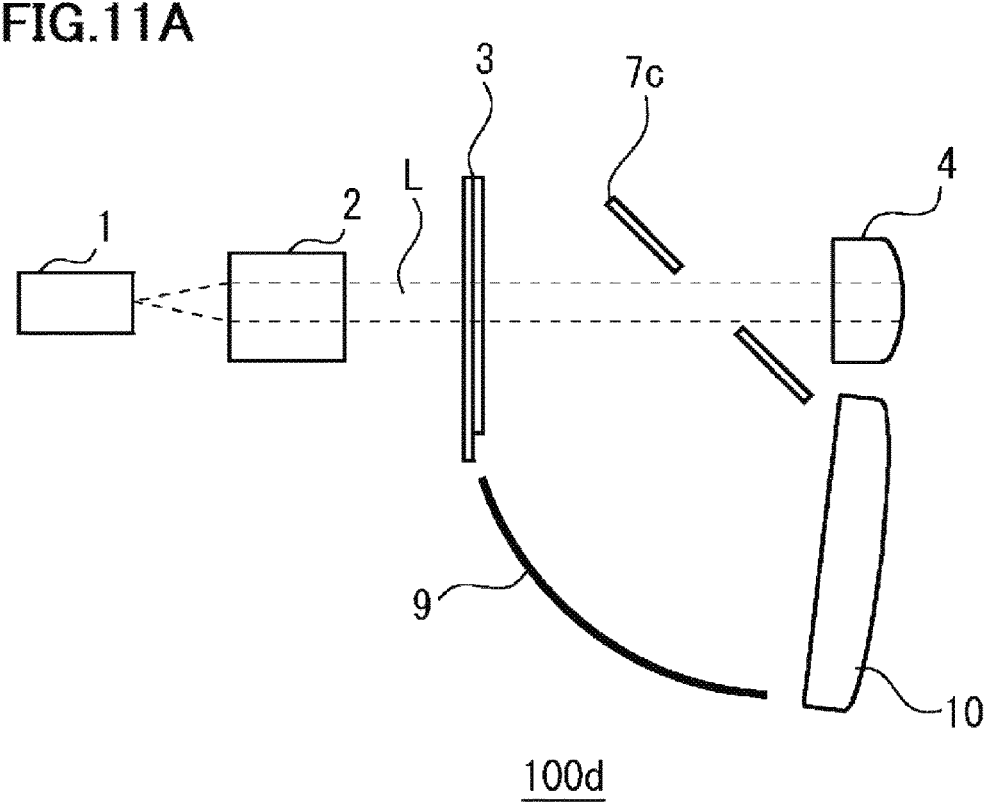
FIGS. 11A and 11B are diagrams for explaining the configuration of the optical projection system of embodiment 5.

FIG. 11A is a diagram for explaining the configuration of the optical projection system of embodiment 5. Here, in embodiment 5, the optical system configuration of the optical projection system 100d is the same as that of the optical projection system 100 of embodiment 1 (refer to FIG. 1) and the electrical configuration of the optical projection system 100d is also the same as that of the optical projection system 100 of embodiment 1 (refer to FIGS. 2A-2B). The only difference between the optical projection system 100d and the optical projection system 100 is that the optical projection system 100d further comprises a reflection type optical diaphragm member 7c, a curved reflecting plate (reflecting member) 9 and a projection lens 10. Therefore, the description of the configurations and their achieved results common to the two embodiments will be omitted, and the configurations and their results different from each other are described below.

The optical diaphragm member 7c is a flat plate-shaped member configured so that at least the reflectance of its surface facing the diffusion type liquid crystal element 3 is high. The optical diaphragm member 7c is disposed on the light path of the nearly parallel beams L and between the diffusion type liquid crystal element 3 and the projection lens 4. Further, the optical diaphragm member 7c is disposed so that its light incident surface is oblique to the light path. The optical diaphragm member 7c of the illustrated example is oblique at an angle of about 45 degrees with respect to the direction of the light path of the nearly parallel beams L which is the lateral direction in the figure. The optical diaphragm member 7c has a through hole similar to the above-described optical diaphragm members 7a and 7b (refer to FIG. 9B), and is provided so that the through hole is positioned on the light path of the nearly parallel beams L. Further, on the light incident surface of the optical diaphragm member 7c which is the surface facing the diffusion type liquid crystal element 3, a film having a high reflectance such as aluminum or silver is provided, for example.

The curved reflecting plate 9 is disposed at a position where the reflected light generated by the optical diaphragm member 7c can be incident, and reflects the incident light toward the projection lens 10.

The projection lens 10 is disposed at a position where the reflected light generated by the curved reflecting plate 9 can be incident, and projects the incident light.

Figure 11B:
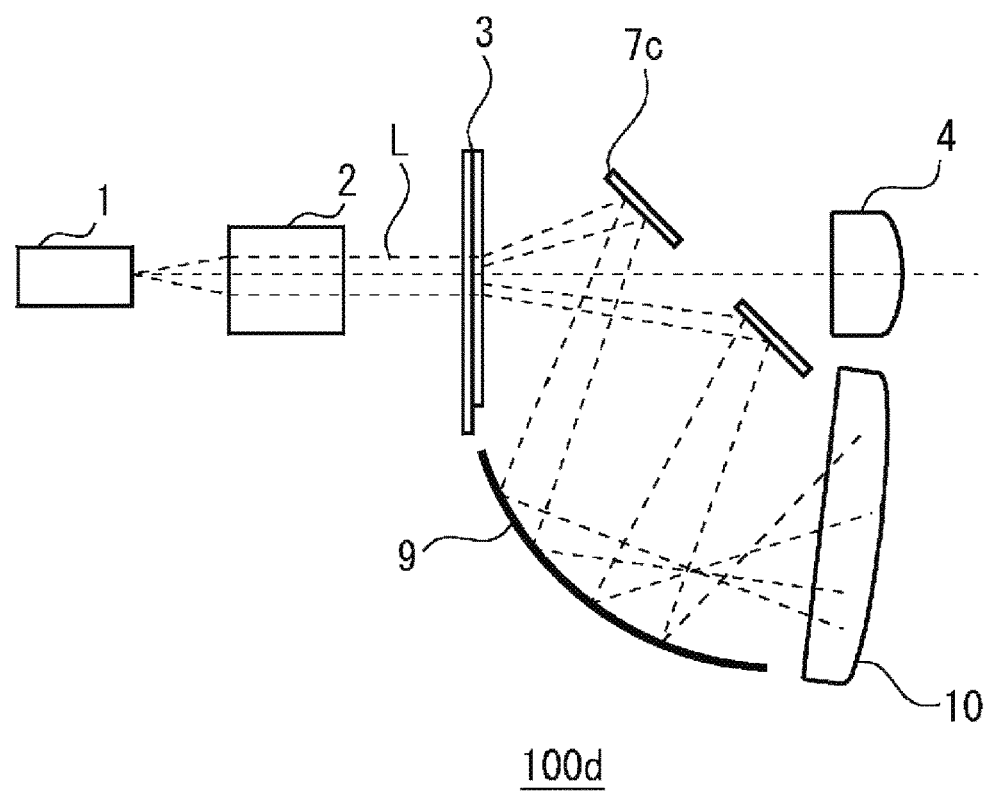

In this optical projection system 100d, similar to the optical projection system 100b of embodiment 3, the contrast of the projected image can be enhanced as well. Further, as shown in FIG. 11B, the light scattered in each pixel region 26 of the diffusion type liquid crystal element 3 is reflected by the optical diaphragm member 7c in the direction different from the light path of the nearly parallel beams L. Further, this reflected light is reflected by curved reflecting plate 9 and enters the projection lens 10 and this incident light is projected by the projection lens 10. Thus, it is possible to reuse the light generated by the scattering.

Embodiment 6

Figure 12:
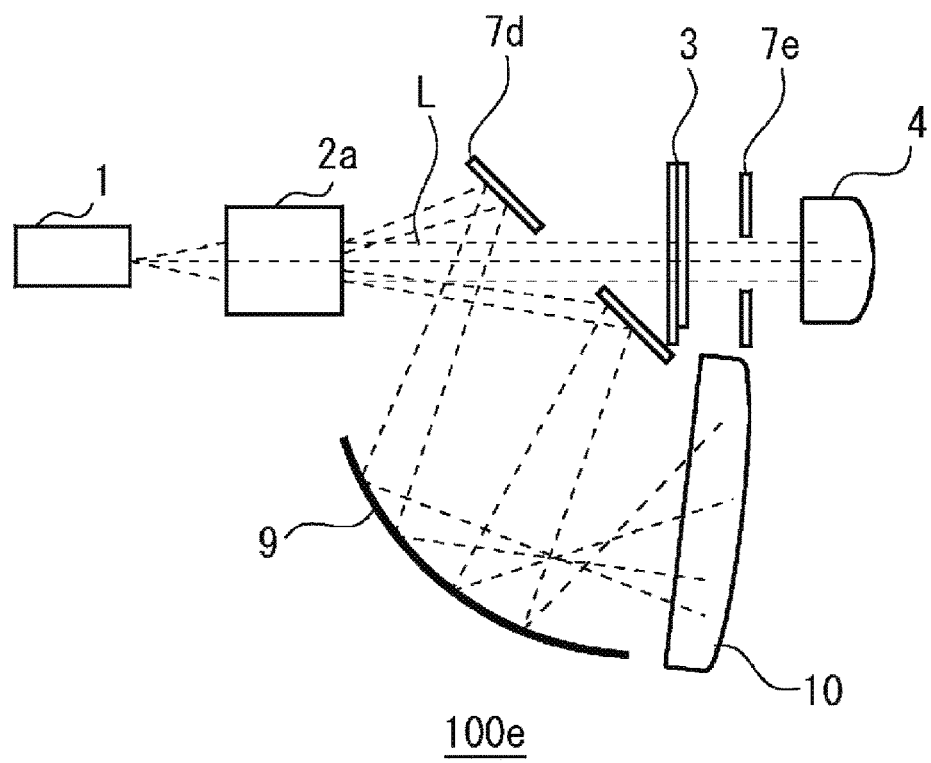
FIG. 12 is a diagram for explaining the configuration of the optical projection system of embodiment 6.

FIG. 12 is a diagram for explaining the configuration of the optical projection system of embodiment 6. Here, in embodiment 6, the optical system configuration of the optical projection system 100e is the same as that of the optical projection system 100 of embodiment 1 (refer to FIG. 1) and the electrical configuration of the optical projection system 100e is also the same as that of the optical projection system 100 of embodiment 1 (refer to FIGS. 2A-2B). The only difference between the optical projection system 100e and the optical projection system 100 is that the optical projection system 100e further comprises a reflective optical diaphragm member 7d, an optical diaphragm member 7e, a curved reflecting plate 9 and a projection lens 10, and that the collimating optical system 2 is replaced by a pseudo-collimating optical system 2a. Therefore, the description of the configurations and their achieved results common to the two embodiments will be omitted, and the configurations and their results different from each other are described below.

The optical diaphragm member 7d is a flat plate-shaped member configured so that the reflectance of at least its surface facing the pseudo-collimating optical system 2a is high. The optical diaphragm member 7d is disposed on the light path of the nearly parallel beams L and between the pseudo-collimating optical system 2a and the diffusion type liquid crystal element 3. Further, the optical diaphragm member 7d is disposed so that its light incident surface is oblique to the light path. The optical diaphragm member 7d of the illustrated example is oblique at an angle of about 45 degrees with respect to the direction of the light path of the nearly parallel beams L which is the lateral direction in the figure. The optical diaphragm member 7d has a through hole similar as above (refer to FIG. 9B), and is provided so that the through hole is positioned on the light path of the parallel beams L. Further, on the light incident surface of the optical diaphragm member 7d which is the surface facing the pseudo-collimating optical system 2a, a film having a high reflectance such as aluminum or silver is provided, for example.

The optical diaphragm member 7e is a flat plate-shaped member disposed between the diffusion type liquid crystal element 3 and the projection lens 4. The optical diaphragm member 7e has a through hole similar to the above-described optical diaphragm members 7a and 7b (refer to FIG. 9B), and is provided so that the through hole is positioned on the light path of the nearly parallel beams L. The optical diaphragm member 7e is disposed so that its light incident surface and its light emitting surface are substantially orthogonal to the traveling direction of the parallel beams. The optical diaphragm member 7e is used to reflect the spreading component of the light emitted from the pseudo-collimating optical system 2a.

The curved reflecting plate 9 is disposed at a position where the reflected light generated by the optical diaphragm member 7d can be incident, and reflects the incident light toward the projection lens 10.

The projection lens 10 is disposed at a position where the reflected light generated by the curved reflecting plate 9 can be incident, and projects the incident light.

In this optical projection system 100e, similar to the optical projection system 100b of embodiment 3, the contrast of the projected image can be enhanced as well. In addition, as in the optical projection system 100d of embodiment 5, it is possible to reuse the light generated by the scattering. Further, it is possible to use a pseudo-collimating optical system that can be realized at relatively low cost. Here, instead of the pseudo-collimating optical system, a collimating optical system may be used.

Embodiment 7

Figure 13:
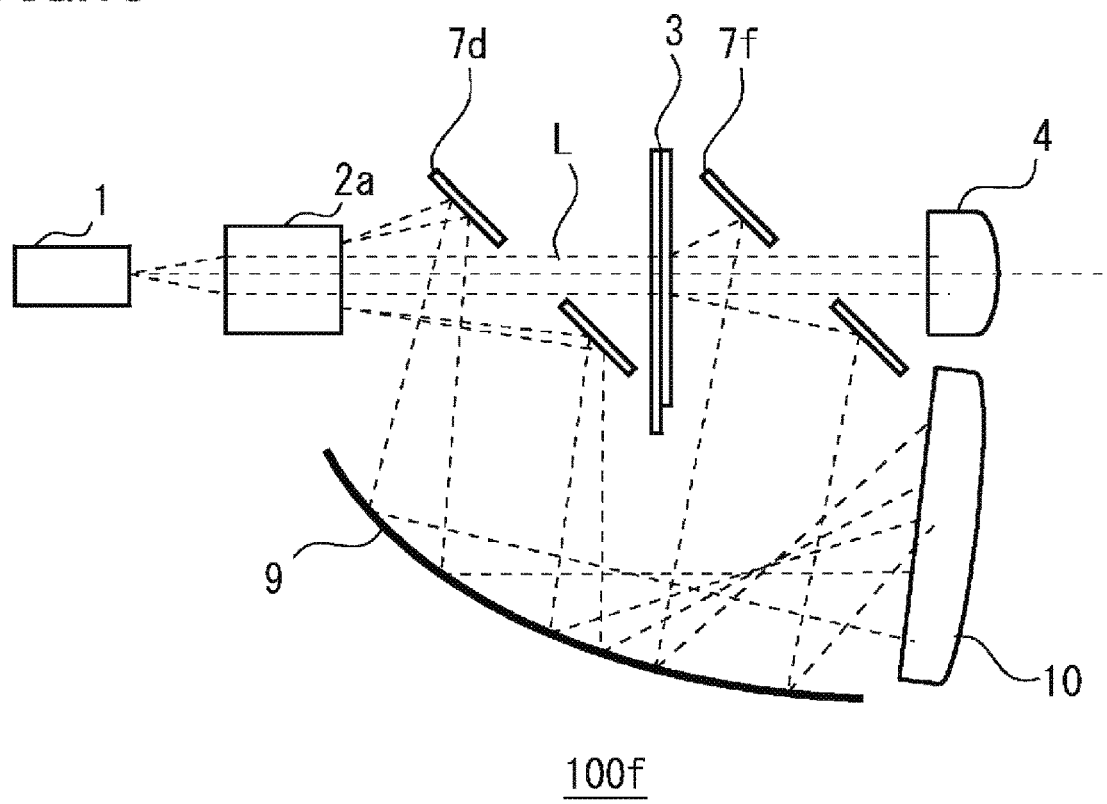
FIG. 13 is a diagram for explaining the configuration of the optical projection system of embodiment 7.

FIG. 13 is a diagram for explaining the configuration of the optical projection system of embodiment 7. Here, in embodiment 7, the optical system configuration of the optical projection system 100f is the same as that of the optical projection system 100 of embodiment 1 (refer to FIG. 1) and the electrical configuration of the optical projection system 100f is also the same as that of the optical projection system 100 of embodiment 1 (refer to FIGS. 2A-2B). In addition, similar to the above-described embodiment 6, a pseudo-collimating optical system 2a, a reflective optical diaphragm member 7d, a curved reflecting plate 9 and a projection lens 10 are provided. Furthermore, an optical diaphragm member 7f disposed obliquely is provided. Therefore, the description of the configurations and their achieved results common to the two embodiments will be omitted, and the configurations and their results different from each other are described below.

The optical diaphragm member 7f is a flat plate-shaped member configured so that the reflectance of at least its surface facing the diffusion type liquid crystal element 3 is high. The optical diaphragm member 7f is disposed on the light path of the nearly parallel beams L and between the diffusion type liquid crystal element 3 and the projection lens 4. Further, the optical diaphragm member 7f is disposed so that its light incident surface is oblique to the light path of the nearly parallel beams L. The optical diaphragm member 7f of the illustrated example is oblique at an angle of about 45 degrees with respect to the direction of the light path of the nearly parallel beams L which is the lateral direction in the figure. The optical diaphragm member 7f has a through hole similar to the above-described optical diaphragm members 7a and 7b (refer to FIG. 9B), and is provided so that the through hole is positioned on the light path of the nearly parallel beams L.

The curved reflecting plate 9 is disposed at a position where the reflected lights generated by each of the optical diaphragm member 7d and the optical diaphragm member 7f can be incident, and reflects the incident lights toward the projection lens 10.

In this optical projection system 100f, similar to the optical projection system 100b of embodiment 3, the contrast of the projected image can be enhanced as well. In addition, as in the optical projection system 100d of embodiment 5, it is possible to reuse the light generated by the scattering. Further, as in the optical projection system 100e of embodiment 6, it is possible to use a pseudo-collimating optical system that can be realized at relatively low cost. Here, instead of the pseudo-collimating optical system, a collimating optical system may be used.

It should be noted that this invention is not limited to the subject matter of the foregoing embodiments, and can be implemented by being variously modified within the scope of the present invention as defined by the appended claims. For example, although the above descriptions exemplify the cases where the present invention is applied to a vehicular lamp or a vehicular lamp system including the same, the scope of application of the present invention is not limited thereto. The present invention can be widely applied to a lighting apparatus in general and an optical projection system comprising the same.

What is claimed is:

1. A lighting apparatus comprising:
   a light source,
   a light conversion part for converting the light emitted from the light source into nearly parallel beams,
   a light modulating part having a plurality of pixel regions arranged so that the nearly parallel beams can be incident and capable of switching between a light transmitting state and a light scattering state for each of the pixel regions, and
   a projection lens disposed on the light path of the nearly parallel beams and on the light emitting side of the light modulating part and wherein the projection lens projects an image formed by the light modulating part using the nearly parallel beams.

2. The lighting apparatus according to claim 1, wherein the size of the light entrance port of the projection lens is approximately equal to the size of the nearly parallel beams.

3. The lighting apparatus according to claim 1, wherein the image formed by the light modulating part and projected by the projection lens is relatively bright at the portion corresponding to the plurality of pixel regions in the light transmitting state and is relatively dark at the portion corresponding to the plurality of pixel regions in the light scattering state.

4. The lighting apparatus according to claim 2, wherein the image formed by the light modulating part and projected by the projection lens is relatively bright at the portion corresponding to the plurality of pixel regions in the light transmitting state and is relatively dark at the portion corresponding to the plurality of pixel regions in the light scattering state.

5. The lighting apparatus according to claim 1, wherein the light modulating part comprises a liquid crystal element disposed on the light path of the nearly parallel beams, and
   wherein the projection lens is arranged with its focal point corresponding to the position of the liquid crystal element.

6. The lighting apparatus according to claim 2, wherein the light modulating part comprises a liquid crystal element disposed on the light path of the nearly parallel beams, and
   wherein the projection lens is arranged with its focal point corresponding to the position of the liquid crystal element.

7. The lighting apparatus according to claim 3, wherein the light modulating part comprises a liquid crystal element disposed on the light path of the nearly parallel beams, and
   wherein the projection lens is arranged with its focal point corresponding to the position of the liquid crystal element.

8. The lighting apparatus according to claim 1, wherein the light modulating part comprises two liquid crystal elements disposed on the light path of the nearly parallel beams, and
   wherein the projection lens is arranged with its focal point corresponding to the intermediate position of the two liquid crystal elements or corresponding to the liquid crystal element on the light emitting side of the two liquid crystal elements.

9. The lighting apparatus according to claim 2, wherein the light modulating part comprises two liquid crystal elements disposed on the light path of the nearly parallel beams, and
   wherein the projection lens is arranged with its focal point corresponding to the intermediate position of the two liquid crystal elements or corresponding to the liquid crystal element on the light emitting side of the two liquid crystal elements.

10. The lighting apparatus according to claim 3, wherein the light modulating part comprises two liquid crystal elements disposed on the light path of the nearly parallel beams, and
    wherein the projection lens is arranged with its focal point corresponding to the intermediate position of the two liquid crystal elements or corresponding to the liquid crystal element on the light emitting side of the two liquid crystal elements.

11. The lighting apparatus according to claim 1 further comprising:
    an optical diaphragm member or a louver disposed on the light path of the nearly parallel beams and between the light modulating part and the projection lens.

12. The lighting apparatus according to claim 2 further comprising:
    an optical diaphragm member or a louver disposed on the light path of the nearly parallel beams and between the light modulating part and the projection lens.

13. The lighting apparatus according to claim 3 further comprising:
    an optical diaphragm member or a louver disposed on the light path of the nearly parallel beams and between the light modulating part and the projection lens.

14. The lighting apparatus according to claim 1 further comprising:
    a reflective optical diaphragm member disposed obliquely on the light path of the nearly parallel beams and between the light conversion part and the light modulating part, and
    a reflecting member for further reflecting the light reflected by the reflective optical diaphragm member.

15. The lighting apparatus according to claim 2 further comprising:
- a reflective optical diaphragm member disposed obliquely on the light path of the nearly parallel beams and between the light conversion part and the light modulating part, and
- a reflecting member for further reflecting the light reflected by the reflective optical diaphragm member.

16. The lighting apparatus according to claim 3 further comprising:
- a reflective optical diaphragm member disposed obliquely on the light path of the nearly parallel beams and between the light conversion part and the light modulating part, and
- a reflecting member for further reflecting the light reflected by the reflective optical diaphragm member.

17. An optical projection system comprising:
the lighting apparatus according to claim 1, and
a control device that controls the operation of each of the plurality of pixel regions in the light modulating part of the lighting apparatus.

18. An optical projection system comprising:
the lighting apparatus according to claim 2, and
a control device that controls the operation of each of the plurality of pixel regions in the light modulating part of the lighting apparatus.

\* \* \* \* \*